United States Patent
Fenger

(10) Patent No.: US 10,611,608 B2
(45) Date of Patent: Apr. 7, 2020

(54) METHOD AND DEVICE FOR AUTOMATIC CONTROL OF THE POSITION OF A BURDEN SUSPENDED IN A MAIN WIRE ON A CRANE

(71) Applicant: LIFTRA IP ApS, Aalborg SV (DK)

(72) Inventor: Per E. Fenger, Terndrup (DK)

(73) Assignee: LIFTRA IP APS, Aalborg SV (DK)

( * ) Notice: Subject to any disclaimer, the term of this patent is extended or adjusted under 35 U.S.C. 154(b) by 239 days.

(21) Appl. No.: 15/307,135

(22) PCT Filed: Apr. 24, 2015

(86) PCT No.: PCT/DK2015/000017
§ 371 (c)(1),
(2) Date: Oct. 27, 2016

(87) PCT Pub. No.: WO2015/165463
PCT Pub. Date: Nov. 5, 2015

(65) Prior Publication Data
US 2017/0050824 A1    Feb. 23, 2017

(30) Foreign Application Priority Data
Apr. 28, 2014   (DK) ................................ 2014 00235

(51) Int. Cl.
*B66C 13/06*    (2006.01)
*B66C 13/08*    (2006.01)
(Continued)

(52) U.S. Cl.
CPC ............ *B66C 13/08* (2013.01); *B66C 23/185* (2013.01); *B66C 23/36* (2013.01)

(58) Field of Classification Search
CPC ........ B66C 12/08; B66C 23/185; B66C 23/36
See application file for complete search history.

(56) References Cited

U.S. PATENT DOCUMENTS 5,253,771 A    10/1993   Mikulas, Jr. et al.
6,439,407 B1    8/2002   Jacoff et al.
(Continued)

FOREIGN PATENT DOCUMENTS

EP    2 364 949 A1    9/2011
JP    2004-67355 A    3/2004
(Continued)

OTHER PUBLICATIONS

JP2013018616A machine translation, Omoto Atsuichi, Sway Angle Detection Sensor for Suspended Load of Crane, Jul. 12, 2011.*

*Primary Examiner* — Kira Nguyen
(74) *Attorney, Agent, or Firm* — David S. Safran; Roberts Calderon Safran & Cole, P.C.

(57) ABSTRACT

A method for automatic control of the position of a burden suspended in a main wire of a crane, where the burden is connected with at least two tag lines which respectively is connected to a number of winches. The control of the position and rotation of the burden is performed by actuators on the respective winches which perform ease off/tightening of the respective tag lines from signals of at least tone measuring unit with signal transmitter located on the burden measuring angles. A central monitoring- and control unit performs control of rotation and position of the burden by multiple transmitting of compensatory control signals to relevant actuators for tag lines and the crane main wire. Guiding and control of the position of the burden is possible even when subject external random impacts, as wind and sea. Further the method is useable in positioning the burden in correct mounting position.

12 Claims, 4 Drawing Sheets

(51) Int. Cl.
*B66C 23/18* (2006.01)
*B66C 23/36* (2006.01)

(56) References Cited

U.S. PATENT DOCUMENTS

| | | | |
|---|---|---|---|
| 7,367,464 B1* | 5/2008 | Agostini | B66C 13/063 |
| | | | 212/308 |
| 8,235,231 B2 | 8/2012 | Schneider et al. | |
| 8,979,148 B1* | 3/2015 | Hatton, II | B66C 1/105 |
| | | | 212/196 |
| 9,120,650 B2 | 9/2015 | Langer et al. | |
| 2012/0328408 A1* | 12/2012 | Sorensen | B66C 23/185 |
| | | | 414/816 |
| 2013/0125397 A1* | 5/2013 | Van den Berg | B66C 23/56 |
| | | | 29/889 |

FOREIGN PATENT DOCUMENTS

| | | |
|---|---|---|
| WO | 2011/048220 A1 | 4/2011 |
| WO | 2011/088832 A1 | 7/2011 |
| WO | 2014/082641 A1 | 6/2014 |
| WO | 2014/125461 A1 | 8/2014 |

* cited by examiner

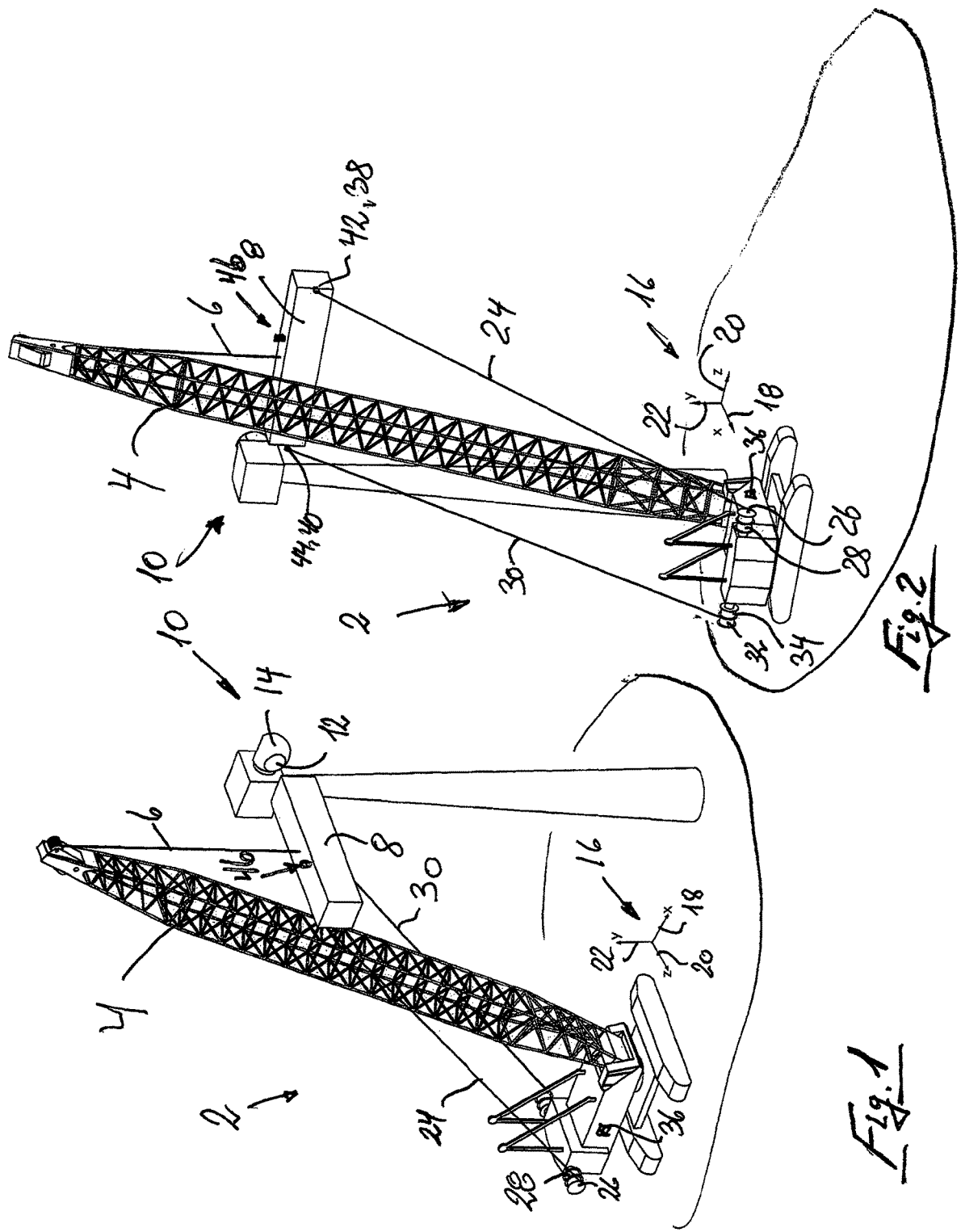

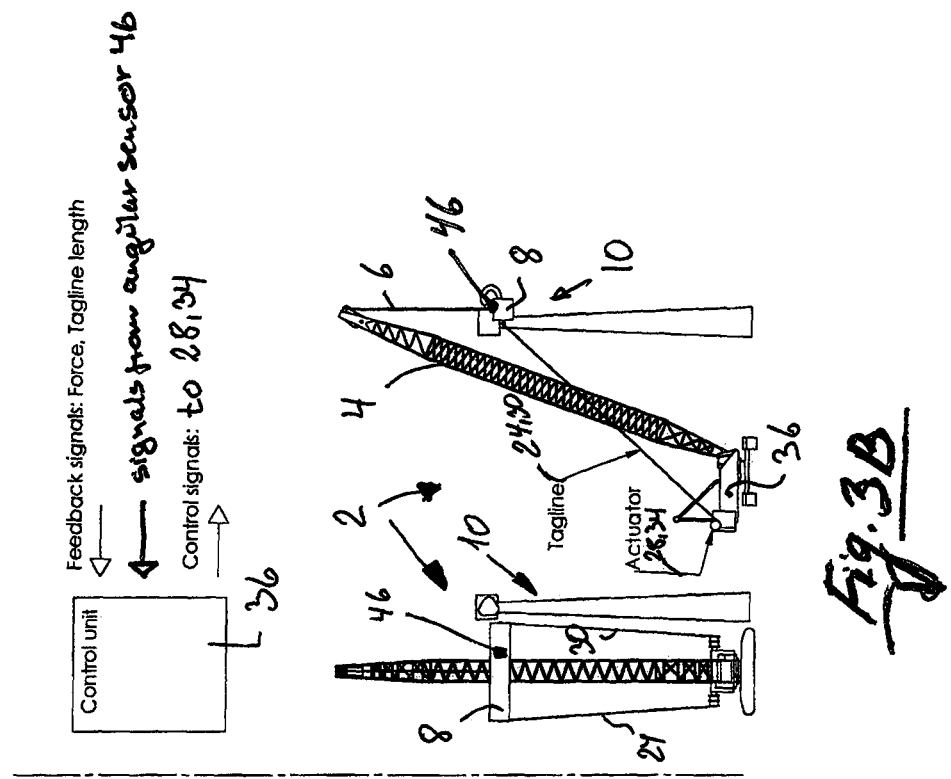
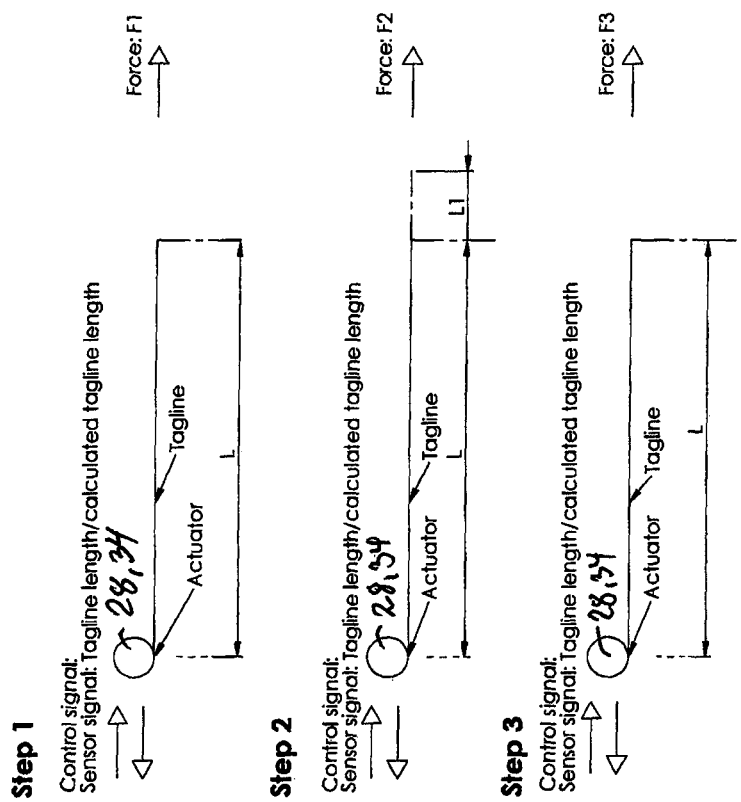

METHOD AND DEVICE FOR AUTOMATIC CONTROL OF THE POSITION OF A BURDEN SUSPENDED IN A MAIN WIRE ON A CRANE

BACKGROUND OF THE INVENTION

Field of the Invention

The present invention relates to a method for automatically controlling the position of a burden suspended from a main wire of a crane where the burden is connected to at least two tag lines which respectively are connected to the number of the tag lines corresponding winches in which the control of the position of burden is carried out by actuators in the respective winch performing firing/tightening of the respective tag lines, from the signals from the measuring devices placed on the burden and/or the crane, and/or outside of the burden and/or the crane, which is fed to a central monitoring and control unit emitting control signals to the actuators.

Description of Related Art

International Patent Application Publication WO 2011 088832 A1 (AH IND. PROJECTS APS) 28. July 2011 and corresponding U.S. Pat. No. 9,238,569, disclose a method for automatic control of the position of a burden ("load") suspended in the main wire of a crane, where the burden is connected to at least two tag lines which are connected to a number of winches corresponding to the number of tag lines, where the control of the position of the burden is performed by actuators on the respective winches which performs ease off, tightening of the respective tag lines based on signals from measurement units (tension sensor means) arranged outside the burden, where the signals are processed in a central monitoring- and control unit which transmits control signals to the actuators for the tag lines.

Controlling the position of a burden which is raised above ground level to be mounted in a precise position by means of a main wire of a crane and winches, causes often problems as the burden is exposed to external physical impacts such as wind, and sometimes influences from seas on the crane.

One example of this is the installation of the blades on wind turbines on land and at sea, where wind action on the blade can be a very disturbing element as the blades typically include a mounting flange, whose holes must be brought to overlap a mounting flange on the turbine hub.

The control has so far been carried out by establishing tag lines, so-called "tag lines" extending between the crane, the crane outrigger arm, the burden and secondary winches, which is controlled manually by the crane operator/operators, with a view to control and maintain the burden in a desired position in which it for example, is to be mounted or attached in some other way. This manually performed the control of the secondary winches is in many cases fully sufficient in most assembly work of this kind, but in some occasions, it has nevertheless shown itself to be insufficient, since the compensation of the length of one or more of the tag lines is only carried out, when the crane operator visually may find that the burden has shifted away from the preferred position, which means that a new positioning of the burden to the mounting position is required, with consequent time consumption. The reason that it will not be possible for the operator to compensate the position of the burden, is that the tag lines give way elastically, during the considerable tensile forces are exposed to, which requires a compensatory adjustment of the length of one or more of the tag lines to maintain the burden in a desired mounting position. Taking in consideration, that the hourly rental rate for the cranes is very high, there will be significant savings by being able to avoid the impact of the burden, resulting in the aforementioned positioning of this should be repeated. Further there is a safety issue in preventing the burden from moving, as personnel are present at assembly points for the burden, where sudden shifts of the burden may cause that dangerous work situations with major security risks occur.

In particular, when mounting the blades on large wind turbines on land the above problems occurs, but significantly more pronounced when installing the blades of wind turbines located in territorial waters, where wind impact of the burden/wings are significantly more pronounced and greater than land-based wind turbines but where the wave activity also influences the position of the crane.

The method according to the invention is in particular developed with the intention of being able to control a blade for a wind turbine during installation thereof, but since the method of the invention is applicable generally to the management of a burden suspended from a lifting wire of a crane, there is instead used term "burden" of the item suspended in the main wire of the crane.

Thus, there is a need to be able to perform a better and more efficient management of the position and rotation of a burden suspended in the main wire of a crane, to carry out assembly work on the installation site for the burden safely and quickly, and also in conditions of larger and more external and uncontrollable physical effects of the burden and the crane.

SUMMARY OF THE INVENTION

It is object of the invention to provide a method for automatically controlling the position of a burden suspended from a main wire of a crane where the burden is connected to at least two tag lines which respectively are connected a winch and where the number winches corresponds to the number of taglines, in which the control of the position of the burden is carried out by actuators on the respective winches performing ease off/tightening of the respective tag lines, from the signals from measuring devices placed on the burden and/or the crane, and/or outside burden and/or the crane, which is fed to a central monitoring- and control unit, which transmit control signals to the actuators for the tag lines.

It is further the object of the invention to provide a system for carrying out the above-method of the invention.

It is realized by the invention that this object can be achieved by a method which is characterized in, that the signals are consisting of data, measured by a registration unit arranged on the burden or the lifting device in which the burden is arranged, relating to current measurements of a number of angles and/or changes in said angles over time, and/or positions and/or changes of positions over time of burden or the lifting device.

Hereby it is achieved that the central monitoring- and control unit on the basis of received signals from the measuring devices, subsequent to processing data from the measuring devices, performs necessary ease off and tightening of the relevant tag lines by transmitting control signals to the appropriate actuators for relevant tag lines, whereby the positioning of the burden in a desired mounting position easier will be maintained, during larger external, uncontrollable, physical impacts of this and/or the crane than it previously has been possible, so it is avoided that the burden moves so much, that the extent of manually performed operations with the crane for the positioning of the burden is reduced and thus the consumption of crane hours.

In another embodiment of the method according to the invention, the central control- and monitoring unit perform control of the position and rotation of the burden by multiple transmitting of compensating control signals to the appropriate actuators for the tag lines and the main wire of the crane, from multiple input signals which are processed in the central monitoring- and control unit.

In the widest extent it is hereby achieved by the use of the method according to the invention, that a crane provided with a control system, build in accordance with the method according to the invention, that a burden suspended from the main wire of a crane, can be lifted up from the ground level and be positioned at the installation site without intervention or operation of the crane functions directly by the operator.

The central monitoring- and control unit carries out processing of multiple data types, and thus performs a fast and very efficient control of the rotation and the position of the burden, suspended in the crane main wire.

In a third embodiment of the method, the signals supplied to the central monitoring- and control unit, further is constituted by
  measurements of wind speed and wind direction at a distance from the burden and/or
  measurements of humidity and/or
  measurements of wave activity/seaway and/or
  measurements of temperature.

This provides the ability of in the central monitoring- and control unit to predict a change in position of the burden based on a future wind gusts, or a wave that influences the crane position, thereby enabling a preventive adjustment of the relevant tag lines, so that a incoming gust of wind or a wave, will not affect the position of burden.

As also the position of the mounting site of the burden is influenced by for example wind and waves, the method according to the invention in a fourth embodiment may include that the signals supplied to the central monitoring- and control unit further consists of
  measurement of the position of the mounting position of the burden and
  calculated distances between a selected or more points and/or angles on the burden and the mounting position of the burden.

This provides the opportunity for a more precise positioning of the burden in relative to the installation site.

The method may in a fifth embodiment include that the signals supplied to the central monitoring- and control unit further consists data from
  determination of the length of the tag lines based on a traction force impact on the tag lines and/or measurement of the length of an actual tag line on an actual winch with a current sensors with digital/analog output connected to the central monitoring- and control unit.

Hereby, it is achieved that the central monitoring- and control unit on basis of registration of an increased traction force in one or more of the tag lines due to uncontrollable external physical influence by the burden or the crane, and recorded lengths of all the tag lines, by emitting of control signals to the appropriate actuators for tag lines to ease of/tighten the relevant tag lines, to maintain the burden in the desired position.

The method may, in a sixth embodiment, comprise that changes to the positioning of the burden is controlled in, that calculations to predict changes in position of burden on the basis of measurements of wind speed and/or direction of the wind and/or wave activity/seaway and/or humidity and/or temperature are performed in the monitoring- and control unit, and that the monitoring- and control unit on the basis of the estimated change of the position of the burden performs compensating displacements of the actuators for the relevant tag lines.

The accuracy of the control of the position of the burden suspended in the main wire of the crane is thereby increased, since, for example, humidity and temperature is affecting the density of the air is in motion due to the wind, which might influence the burden in a larger or lesser extent.

The possibility to carry out rotation of the burden in order to position it correctly is of great importance in the performance of the assembly work why it is preferred that in the method according to the invention, are used a number of tag lines to the control/management of the rotation of the burden about the x axis, y-axis and z-axis, wherein the x-axis is defined as a horizontally oriented axis oriented towards the crane outrigger arm, the z-axis is defined as a horizontally oriented axis extending orthogonal to the x-axis and y-axis is defined as a vertically oriented axis extending orthogonal to the x-axis and y-axis.

The possibility of being able to displace a burden suspended from the crane's main wire is also of great importance in the performance of the assembly works, why it is preferred that in the method according to the invention, a number of tag lines to the control/command of the displacement of the burden along the x axis, and the z-axis.

In a further embodiment of the method according to the invention, the signals supplied to the central monitoring and control unit consists further of additional data from a global positioning system (GPS) or a local positioning system related respectively to the burden and/or the installation site of the burden.

The advantage of this is that it becomes possible, faster and more accurately, to manage the burden, or a relevant end portion thereof towards the mounting site, taking into account not only the position of the burden, but also the location for the assembly position, and possibly occurring changes of the assembly position.

A further embodiment of the method according to the invention comprises that the central monitoring- and control unit performs the control of the position of the burden by multiple transmission of control signals to the appropriate actuators for the tag lines and the crane main wire, from the multiple input signals processed in the central monitoring- and control unit.

A device for carrying out the method according to the invention is characterized by comprising at least one on the burden—, or on a lifting device in which the burden is arranged, —mounted IMU (Inertial Measurement Unit) which transmits signals containing data concerning rendered measurement of angles and position, changes of angles over time, and changes of positions over time for the burden, to a central monitoring- and control unit that performs control of rotation and position of the burden by multiple transmitting of compensatory control signals to relevant actuators for tag lines and the crane main wire from multiple input of signals which are processed in the central monitoring- and control unit, and said device further comprises a manual operated control panel for controlling the operations of the crane, which control panel is connected with the central monitoring- and control unit.

The device according to the invention will when used, for example, mounting the blades of wind turbine hub, significantly enhance the efficiency of the task of positioning a wind turbine blade correctly in relation to the installation site of the wind turbine hub, as the crane operator does not need to concentrate on compensating for external influences on the blade suspended from the crane's main wire, but only need to concentrate on operating the crane's main functions in terms of lift and rotation of the crane.

The invention is explained in more detail in the following with reference to the accompanying drawings.

BRIEF DESCRIPTION OF THE DRAWINGS

FIG. 1 is a perspective view of a crane with a burden arranged in the main wire, with tag lines connected to the burden, indicating the axes x, y, z, FIG. 2 shows the same as FIG. 1, but seen from another angle, FIGS. 3A and 3B are illustrations of an embodiment of the method for controlling the position of a burden suspended from a main wire of a crane, according to the invention.

DETAILED DESCRIPTION OF THE INVENTION

Figure 4:
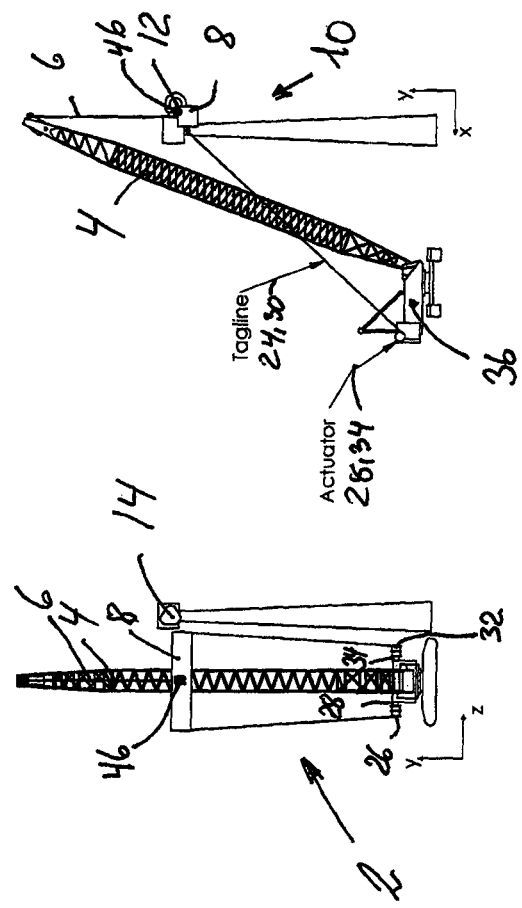
FIG. 4 is an illustration of a further embodiment of the method for controlling the position of a burden suspended from a main wire of a crane, according to the invention.

In FIG. 1 and FIG. 2 is shown a crane 2, comprising a crane boom 4 with a main wire 6 in which a burden 8 which in the illustrated embodiment consists of a blade for a wind turbine 10, for mounting on a mounting surface 12 on the turbine hub 14. The burden 8 (blade) as shown in the drawings are illustrated highly simplified as that the blade could be arranged in a device in which the blade is carried. FIG. 1 and FIG. 2 shows the same, but viewed from different angles.

As it appears from the figures, there is indicated a three-dimensional coordinate system 16 with a horizontally oriented x-axis 18 oriented towards the crane boom 4, one horizontally oriented z-axis 20 oriented perpendicular to the x-axis 18, and a vertical oriented y-axis 22, respectively, oriented perpendicular to the x-axis 18 and z-axis 20.

As also seen in FIG. 1 and FIG. 2, a first guide wire 24 extends between the burden 8 and a first winch 26, with a first actuator 28 and a second guide wire 30 extends between the burden 8 and a second winch 32, with a second actuator 34. The actuators 28, 34 are connected with a central monitoring- and control unit 36 on the crane. It should be noted that the central monitoring- and control unit 36 may be dislocated externally, for example, as a portable device.

Figure 5:
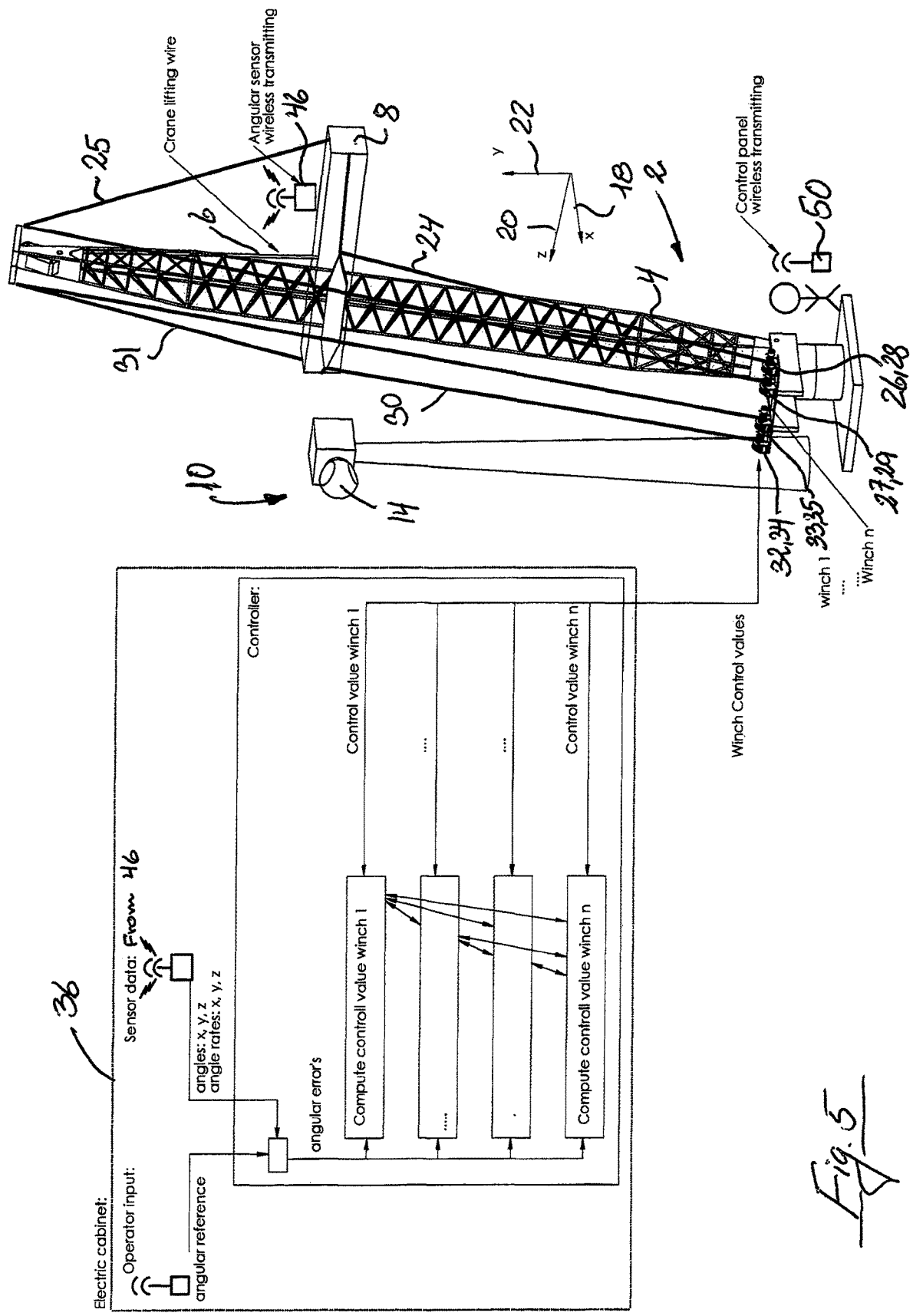

As further seen in FIGS. 1-4, and in particular in FIG. 5, an angle sensor 46 is placed with a wireless transmitter on the burden, a so-called IMU (Inertial Measurement Unit) which is in communication with the central monitoring- and control unit 36. The angle sensor 46 is able to detect the angles and angular deviations, and changes of the angles over time (angular velocities) in all directions (x, y, z), as well as position. Measured data on these matters is converted in the wireless transmitter to signals which interactively are transmitted to the central monitoring- and control unit 36, which based on the received signals from the angle sensor 46, performs control of the position of the burden 8 by multiple transmission of control signals to the relevant actuators 28, 29, 34, 35, for tag lines 24, 25, 30, 31 and the crane main wire 6, from multiple input signals processed in the central monitoring and control unit 36.

It should be noted that the central monitoring- and control unit 36 may also receive and process signals from other relevant signal generators, comprising data concerning; wind speed, wind direction, humidity, wave activity, temperature, mounting position for the burden, calculated distances and/or angles over time between a selected point or multiple points or angles on the burden 8, and the installation position 12 of the burden 8 thereof.

In the attachment points 38, 40, respectively, for the first and the second guide wire 24, 30 is, in the illustrated embodiment of the method according to the invention shown in FIG. 1-4, disposed a first sensor 42 and second sensor 44, which continuously detects the traction force in the respective tag lines 24, 30. The sensors 42, 44 may alternatively be disposed on the crane 2. It should be noted the embodiment shown in FIG. 5 comprising tag lines 25 and 31 also may include sensors for detecting the traction force in the tag lines. All data relating to traction force in the respective tag lines 24, 25, 30, 31 are converted into signals containing data relating to said recorded traction forces applied to the central monitoring- and control unit.

A counter-clockwise rotation of the burden 8 about the y-axis 22, may, for example, take place in that the actuator 28, performs an ease off on the first winch 26, whereby the first tag line 24 is extended, simultaneously with the second actuator 34 performs a similar hauling with the second game 32, wherein the second tag line 30 is shortened.

It is noted that the number of tag lines on a crane may be more than the two shown and described above, see for example, FIG. 5 but of the interest of clarity is initially only referred to the two shown in the drawing in FIG. 1 and FIG. 2, FIG. 3 and FIG. 4. But it will be granted, that the use of more tag lines, for example, arranged with bases on the crane arm 4, cf. FIG. 5, it will be possible to displace the burden to a desired position with high accuracy.

In FIG. 5 is shown an embodiment of the invention, comprising four tag lines 24, 25, 30, 31, each with its own winch 26, 27, 32, 33, and sensors 28, 29, 34, 35, of which two of the tag lines have bases on the crane arm 4. The central monitoring and control unit 36 is also shown, where it is tried in a generally diagrammatically way to illustrate how a device for carrying out the method according to the invention operates in practice.

The device comprises the angle sensor 46 with the wireless transmitter, and a portable operator-operated control panel 50, which both communicates wirelessly with the central monitoring- and control unit 36. The central monitoring- and control unit 36 receives interactive data from the angle sensor 46, processed by the central monitoring- and control unit 36, which subsequently sends control signals to the actuators on the winches 28, 29, 34, 35, and the central monitoring- and control unit 36 also receives current control values from the sensors measuring the length of the tag lines 24, 25, 30, 31 and the traction force in the respective wires. Thus, the central monitoring- and control unit 36 performs control of the rotation and position of the burden 8 by multiple sending of compensating control signals to relevant actuators 28, 29, 34, 35 for the tag lines 24, 25, 30, 31 and the crane main wire 6, from multiple load of signals which is processed in the central monitoring- and control unit 36.

The actuators 28, 29, 34, 35 of the winches 26, 27, 32, 33 continuously records the length of tag lines 24, 25, 30, 31 and signals in this regard is supplied to the central monitoring- and control unit 36.

Signals regarding registered traction force in the respective tag lines 24, 30, registered at the first sensor 42 and second sensor 44 is also ongoing supplied the central monitoring- and control unit 36, which on the basis of said registered traction calculates the actual length of the respective tag lines 24, 30 and in the event of changes in the lengths of the respective tag lines 24, 30, sends a signal to the relevant actuator 28, 34 to compensate for changes in length, by activation of the winches 26, 32. Measurement of the traction forces is, however, secondary to the monitoring- and controlling the burden 8, the central monitoring- and control unit 36 performs, as this is primarily based on the received signals from the recording unit 46 which is arranged on the burden 8.

FIGS. 3A and 3B show how a control system of the prior art operates, where control of the rotation and positioning of the burden 8 solely is based on measurement of the traction forces in the tag lines.

Step 1 shows how a relevant actuator 28, 34 has detected the length of a guide wire 24, 30, and the traction F1 in the same, registered by the sensors 42, 44.

Step 2 shows how that a change of the force F2 at one or both tag lines 24, 30, has taken place for example, as a result of the effect of wind on the burden 8, is detected on the sensors 42, 44 and the change of the force is treated in the central monitoring- and control unit 36 which calculates the amount of the respective tag lines 24, 30 is extended (L1) upon which the central monitoring- and control unit 36 emits control signal (step 3) to the actuators 28, 34 to carry out the activation of the winches 26, 32 for adjustment of the length of the respective tag lines 24, 30 (in the case shown by tighening the wire), so the position of the burden 8 is maintained.

Step 1, 2 and 3 are repeated continuously, so that the central monitoring- and control unit 36 receives continuous updated signals from the sensors 42, 44 and the actuators 28, 34 and the central monitoring- and control unit 36 performs a continually calculate the length of tag lines 24, 30, and performs continuously necessary adjustment of the length of the tag lines, for retaining the position of the burden 8.

FIG. 4 shows a version of the method according to the invention in which the central monitoring and control unit 36 receives signals relating to the position, the rotational/angular motion and angular speed of the burden 8 from a signal generator 46 located on the burden 8. The signals are processed in the central monitoring- and control unit 36 upon which control signals are transmitted to the actuators 28, 34, concerning adjusting the length of the tag lines 24, 30. This version of the method according to the invention may also include that the central monitoring- and control unit 36 also receives and processes signals from the sensors 42, 44 and actuators 28, 34.

In FIG. 5 is shown a version of the method according to the invention in which the central monitoring- and control unit 36 receives signals relating to the position, the rotational/angular motion and angular speed of the burden 8 from a signal transmitter located on the burden 8 in form of an angle sensor 46 which includes a wireless transmitter, a so-called IMU (Inertial Measurement Unit). The signals are processed in the central monitoring- and control unit 36 upon which control signals to the actuators 28, 29, 34, 35, adjusting the length of the tag lines 24, 25, 30, 31, are transmitted. This embodiment of the method according to the invention may also comprise that the central monitoring- and control unit 36 also receives and processes signals from the sensors 42, 44 and actuators 28, 29, 34, 35, and other signal generators with relevant data for processing in the central monitoring- and control unit 36, referred to above, for positioning of the burden 8 after which the central monitoring- and control unit (36) performs control of rotation and position of the burden (8) by multiple transmission of compensating control signals to the relevant actuators (28, 29, 34, 35) for the tag lines (24, 25, 30, 31) and the crane main wire (6).

In FIG. 5 appears, furthermore, the main components forming part of a device for performing the method according to the invention, namely, the angle sensor 46 with the signal generator, the central monitoring- and control unit 36, signal generators and signal receivers, and the operator-operated control panel 50, with signal transmitter and signal receiver for communication with the central monitoring- and control unit 36.

Thus, by the invention, there is provided a method and a device for obtaining an unprecedented effective control of the rotation and displacement of a burden 8 suspended by the main wire 6 of a crane 2, as said control is effected by multiple transmittal of compensating control signals to relevant actuators 28, 29, 34, 35 for the tag lines 24, 25, 30, 31 and the crane main wire 6 from multiple input signals relating angles and angular velocities measured by one or more, on the burden 8 disposed angle sensor(s) 46 which includes a wireless transmitter, a so-called IMU (Inertial Measurement Unit), said signals being processed in the central monitoring- and control unit 36. The advantage is that control is based on actual measured variations of angles and angular speeds of the burden, and not on indirect measurements of tension in the tag lines 24, 25, 30, 31, where the lengths of these must first be determined by calculations in the central monitoring- and control unit 36.

What is claimed is:

1. Method for automatic control of the position of a burden suspended on a main wire of a crane, where the burden is connected to at least two tag lines which are connected to a number of winches corresponding to the number of tag lines, comprising:

using signals from sensors arranged on the burden or on the lifting device on which the burden is arranged to obtain current measurement data of at least one of an angle of rotation of the burden around a center axis of the main wire and changes in said angle of rotation over time, and issuing angle of rotation signals from said sensors based on the obtained current measurement data, processing the signals from the sensors in a central monitoring- and control unit and transmitting control signals to the actuators for the tag lines, and controlling positioning of the burden with the actuators on the respective winches to perform ease off/tightening of the respective tag lines based on the angle of rotation signals issued.

2. The method according to claim 1, wherein the central monitoring- and control unit controls rotation and position of the burden by transmitting of multiple compensating control signals to respective actuators for the tag lines and the main wire of the crane based on said signals from said sensors based on the obtained current measurement data.

3. The method according to claim 2, wherein the angle of rotation signals from the sensors further comprise data from measurements of at least one of:

wind speed and wind direction relative to the burden,
measurements of humidity,
measurements of wave activity/seaway,
measurements of the temperature.

4. The method according to claim 1, wherein, for taking into consideration conditions affecting the position of the mounting site of the burden, the signals further comprise measurement data of a mounting position of the burden on an object and calculated distances between selected points at the mounting position on the object and the burden.

5. The method according to claim 1, wherein the signals further comprise data determined as to the length of the tag lines based on at least one of a traction force impact on the tag lines and measurement of the length of the tag lines with current sensors connected to the central monitoring- and control unit.

6. The method according to claim 1, wherein changes to the positioning of the burden is further controlled using calculations to predict changes of the position of the burden on the basis of measurements of at least one of wind speed, wind direction, and wave/seaway activity, humidity, temperature performed in the monitoring- and control unit, and wherein the monitoring- and control unit, on the basis of the predicted change of the position of the burden, performs compensating displacements with the actuators and winches.

7. The method according to claim 1, wherein a number of tag lines is used for control of the rotation of the burden around horizontal and vertical axes.

8. The method according to claim 1, wherein a plurality of tag lines (24, 25, 30, 31) are used for stabilizing, control/guiding of displacement of the burden (8) along the x-axis (18) and the z-axis (20).

9. The method according to claim 1, wherein the signals from the sensors comprise position data as to the location of the burden obtained from a global positioning system (GPS) or a local positioning system.

10. The method according to claim 1, wherein sensors are also used to determine at least one of positions of the burden, changes of the positions of the burden over time, and changes of positions of the lifting device on which the burden is arranged, and wherein signals are issued based on the positions or changes determined.

11. Device for automatic control of the position of a burden suspended on a main wire of a crane, where the burden is connected to at least two tag lines which are connected to a number of winches corresponding to the number of tag lines, comprising:
  actuators for the tag lines and main wire,
  a central monitoring- and control unit, the central monitoring- and control unit having means for processing and transmitting control signals to the actuators for the tag lines and main wire of the crane to control the angular rotation around the center axis of the main wire and position of the burden,
  at least one inertial measurement unit arranged on the burden or on a lifting aggregate on which the burden is arranged, said inertial measurement unit having means transmitting angle of rotation signals providing current measurements of at least one of an angle of rotation of the burden around a center axis of the main wire and changes in said angle of rotation around the center axis of the main wire over time, for control of angular rotation and position of the burden by multiple transmitting of compensatory control signals to the central monitoring- and control unit having means for processing and transmitting control signals to the actuators for the tag lines and main wire of the crane to control the angular rotation around the center axis of the main wire and position of the burden, and
  a manually operated control panel for controlling the operations of the crane that is connected with the central monitoring- and control unit.

12. The device according to claim 11, wherein said inertial measurement unit also has sensors for determining at least one of positions of the burden, changes of the positions of the burden over time, and changes of positions of the lifting device on which the burden is arranged and for issuing signals based on the positions determined.

\* \* \* \* \*